United States Patent [19]

Page

[11] Patent Number: 5,941,507
[45] Date of Patent: Aug. 24, 1999

[54] CABLE INSTALLATION GUIDE

[76] Inventor: Douglas Monroe Page, 1546 Kirkwood St., North Port, Fla. 34286

[21] Appl. No.: 09/109,718

[22] Filed: Jul. 2, 1998

[51] Int. Cl.⁶ .................................................. B65H 59/00
[52] U.S. Cl. .................................................. 254/134.3 PA
[58] Field of Search ...................... 254/134 PA, 134.3 R, 254/134.3 FT, 134.5

[56] References Cited

U.S. PATENT DOCUMENTS

| | | | |
|---|---|---|---|
| 1,878,859 | 9/1932 | Knabenshue | 254/134.3 PA |
| 2,202,184 | 5/1940 | Berger | 254/134.3 PA |
| 2,806,380 | 9/1957 | Martin | 254/134.3 PA |
| 3,012,756 | 12/1961 | Cronknight | 254/134.3 PA |
| 3,145,973 | 8/1964 | MacFarlane | 254/134 PA |
| 4,420,143 | 12/1983 | Harris | 254/134.3 PA |
| 4,690,381 | 9/1987 | Asai | 254/134.3 R |
| 5,735,505 | 4/1998 | Walton | 254/134.4 PA |

*Primary Examiner*—David A. Scherbel
*Assistant Examiner*—Lee Wilson
*Attorney, Agent, or Firm*—Frank A. Lukasik

[57] ABSTRACT

A device and method for pulling large conductive cables and similar objects around deflections or angular structures is provided. A dolly connected to a cable hoist includes a pulley with a groove that accommodates the cable. A heavy rope or hawser connected to the cable and a small leader rope connected to the hawser enable the cable to be drawn into the groove in the pulley. A retainer in the dolly prevents the ropes from being displaced from the pulley while the dolly is lifted into position, whereby the cable may be installed without the roses being jammed or jumping out of the pulley groove.

1 Claim, 5 Drawing Sheets

CABLE INSTALLATION GUIDE

BACKGROUND OF THE INVENTION

1. Field of the Invention

This invention relates to guides used in the installation of conductive cables on structures wherein dollies are required to guide a cable at an angle or around a deflection.

2. Description of the Prior Art

Heretofore, devices for running a large cable around a deflection or an angular structure have required first a small-diameter rope or leader to begin the installation and thereafter a high strength bullrope or hawser to pull large cables into position. Experience has shown that the larger dollies capable of handling the high tensions induced by deflections or structural angles in the installation of large cables cannot prevent the small lead ropes required from jumping out of a large dolly groove and, in some instances, becoming bound in the spokes thereof. The foregoing is true where, in the past, it has been necessary, particularly at heights of from substantially 45 inches to 400 feet or more, to transfer the bullrope or hawser from the pulley of a small-diameter dolly to the pulley of a dolly having a substantially larger diameter.

Prior cable installation procedures have overcome this problem only by requiring additional personnel and equipment to transfer the bullrope from a small 8-inch dolly to a substantially larger 22-inch dolly. The present invention avoids or eliminates these procedures by providing a means for retaining the small lead rope in large dolly pulley grooves, thereby eliminating the need for a small dolly.

U.S. Pat. No. 5,357,054 to Beckerich relates to a cable installation method and apparatus in which a steel conduit is placed against a column and magnetically held in place by a conduit holder magnetically attached to the conduit and to the column to hold the conduit in proper location while it is clamped to the column by a clamp fastened to the column by a screw. Armored cable is passed over a smoothly contoured guide magnetically secured to bar joists, both at the cable feeding end and at the cable pulling end or drop end to facilitate the pulling of the cable from a supply coil on the floor up and over one bar joist and down another bar joist spaced from it, for connection to the rough-in box. It is submitted that this reference is patentably distinct from the present invention both in the magnetic holder and the absence of a reference regarding the use of dollies to string cables, among other distinctions.

U.S. Pat. No. 4,475,715 to Asplin relates to the use of two spaced generally L-shaped members whose vertical portions have hooked ends that suspend a block from a support cable at a pole location, and a stabilizing bar that abuts the pole to maintain the frame in a position wherein the leg members extend horizontally outwardly from the pole to provide two spaced points of support for at coaxial cable, being installed to prevent kinking or bending of the cable. It is believed that the L-shaped members are clearly distinguishable from applicant's use of a single dolly in stringing a cable around deflections or building angles, among other patentable distinctions.

It can readily be appreciated that these references, either singly or in combination, are not concerned with and do not suggest or infer the teachings of the present invention for eliminating the need for both small and large dolly pulleys in pulling large conductive cables and similar objects onto structures having deflections or angle structures.

SUMMARY OF THE INVENTION

Accordingly, it is an object of the invention to provide a system and apparatus that requires the use of only a large dolly for pulling conductive cables into place at varying heights above the ground.

It is another object of the invention to provide such a system and apparatus wherein a small, easily manipulated leader may be used, in conjunction with a large dolly, to initiate installation of conductive cables at varying heights above the ground.

It is a further object of the invention to provide a simplified system and apparatus for guiding a conductive cable during installation thereof that does not require changing a leader from a small dolly to a large dolly at varying heights above the ground.

The foregoing objects are realized in the present invention by fitting large dollies with side-guides for preventing an unrestrained but necessary small lead rope from slipping or leaping out of the groove of the large dolly pulleys.

BRIEF DESCRIPTION OF THE DRAWINGS

The foregoing and further objects of the invention will become apparent from reading the following detailed description of preferred embodiments thereof, in which.

DETAILED DESCRIPTION OF THE INVENTION

Figure 1:
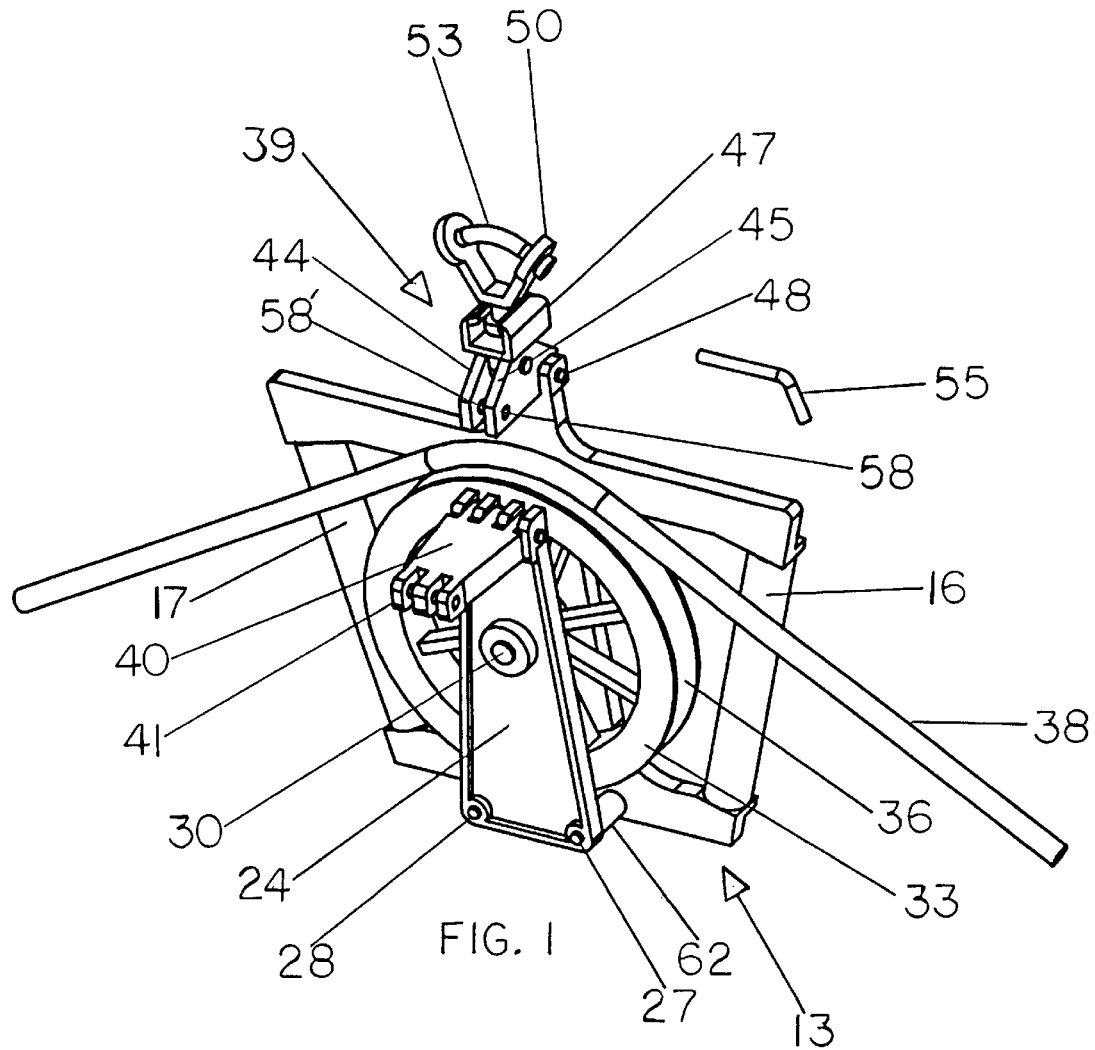
FIG. 1 is a perspective view of a preferred embodiment of the invention after a conductive cable has been installed in the groove of a large pulley.
Figure 4:
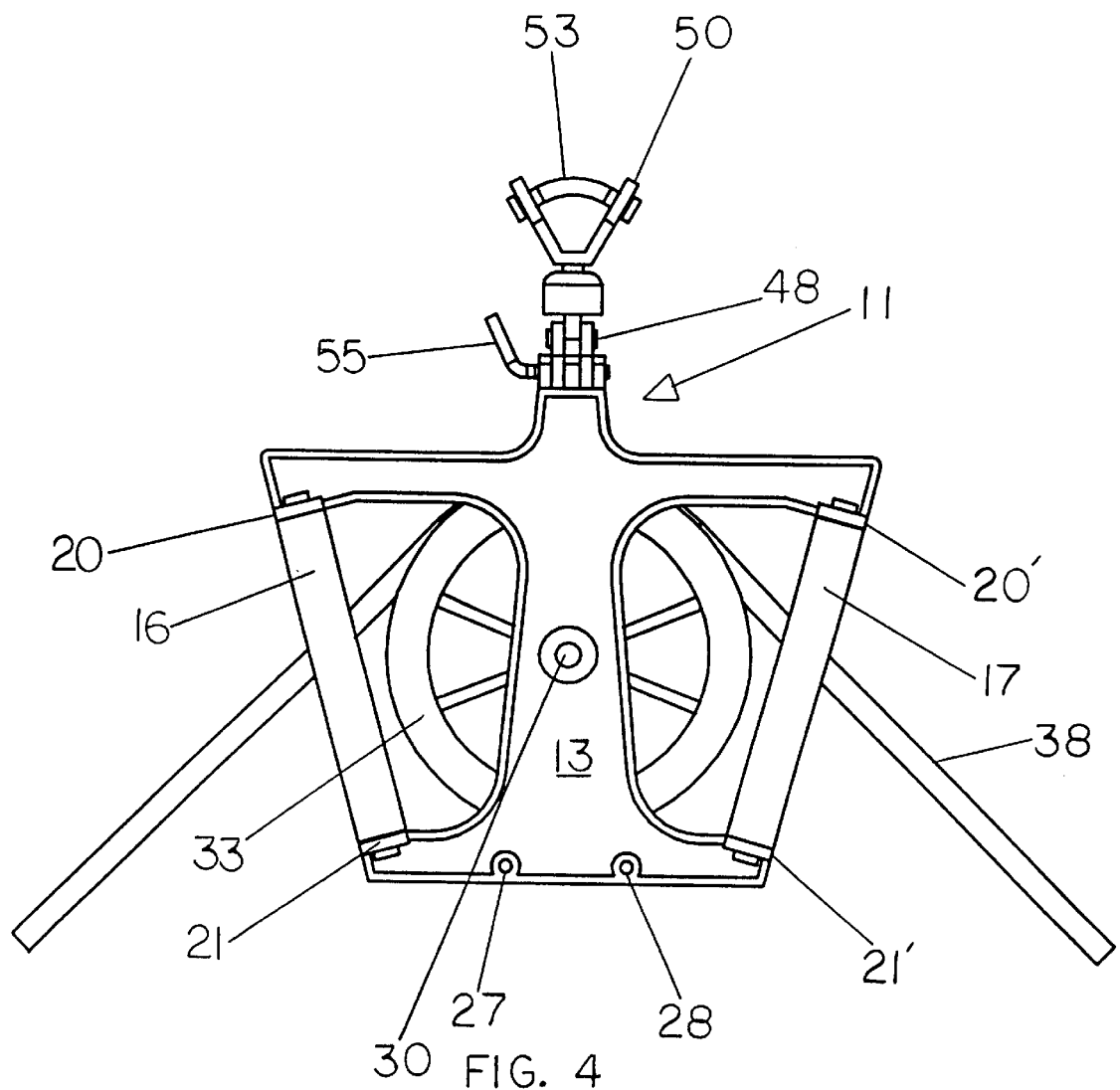
FIG. 4 is a rear elevation of the embodiment shown in FIG. 2.

Turning now to the drawings, more particularly to FIGS. 1 and 4, there is shown a rope-to-cable pulling device such as a dolly 11 which includes a side-guide 13 having rollers 16 and 17 mounted thereon in brackets 20, 20' and 21, 21' and a mounting plate 24 that is secured to side-guide 13 by bolts 27 and 28 in parallel relationship therewith. An axle 30 for a pulley 33 also supports mounting plate 24 and side-guide 13 in dolly 11. A groove 36 in pulley 33 receives a conductive cable 38 and a small leader rope, not shown, connected to a large hawser, not shown, whose diameter is substantially the same as the diameter of cable 38. In FIG. 1, dolly 11 is seen to include a holding and locking assembly 39 that includes a gate 40 pivotally mounted on plate 24 and having a plurality of teeth 41 that are adapted to mesh with a pair of brackets 44 and 45 secured to a holder 47 in assembly 39 with assembly 39 pivotally mounted on side-guide 13 by a pin 48. A removable clevis 50 is contained in and rotatable with respect to holder 47 in a conventional manner, not shown, and an arcuate bolt 53 is secured in clevis 50 to permit, in connection with holder 47, swivelable action of side-guide 13 when the latter is lifted, by a conventional cable hoist, not shown, to a desired position during the installation of cable 38. A pair of spacers of which only one, 62, is shown are operative to maintain a desired separation between rims 64 and 65 of pulley 33 and side-guide 13 and plate 24.

Figure 2:
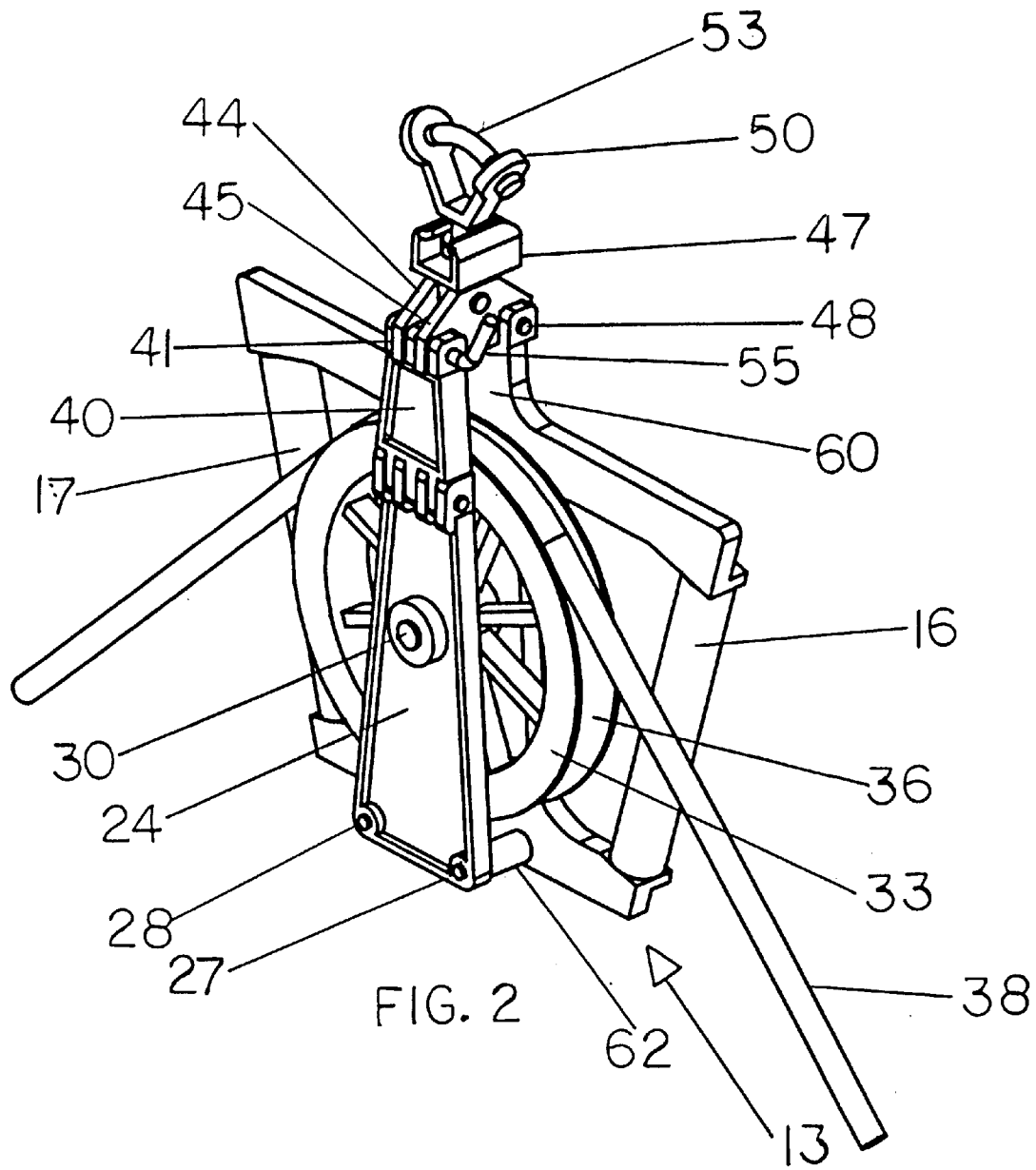
FIG. 2 is a perspective view of the embodiment of FIG. 1 with the rope retaining means of the invention secured in place.
Figure 3:
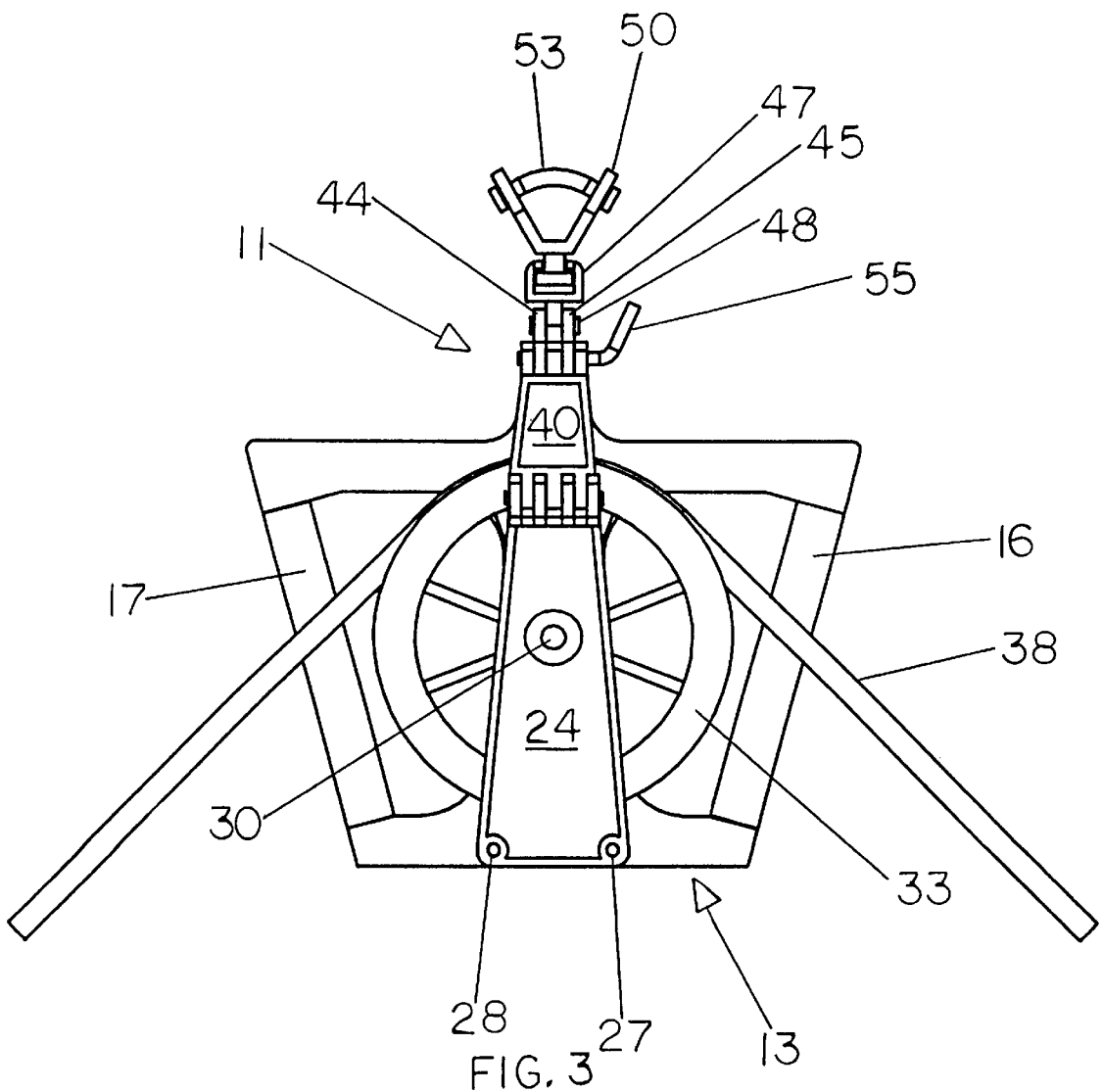
FIG. 3 is a front elevation of the embodiment shown in FIG. 2.
Figure 5:
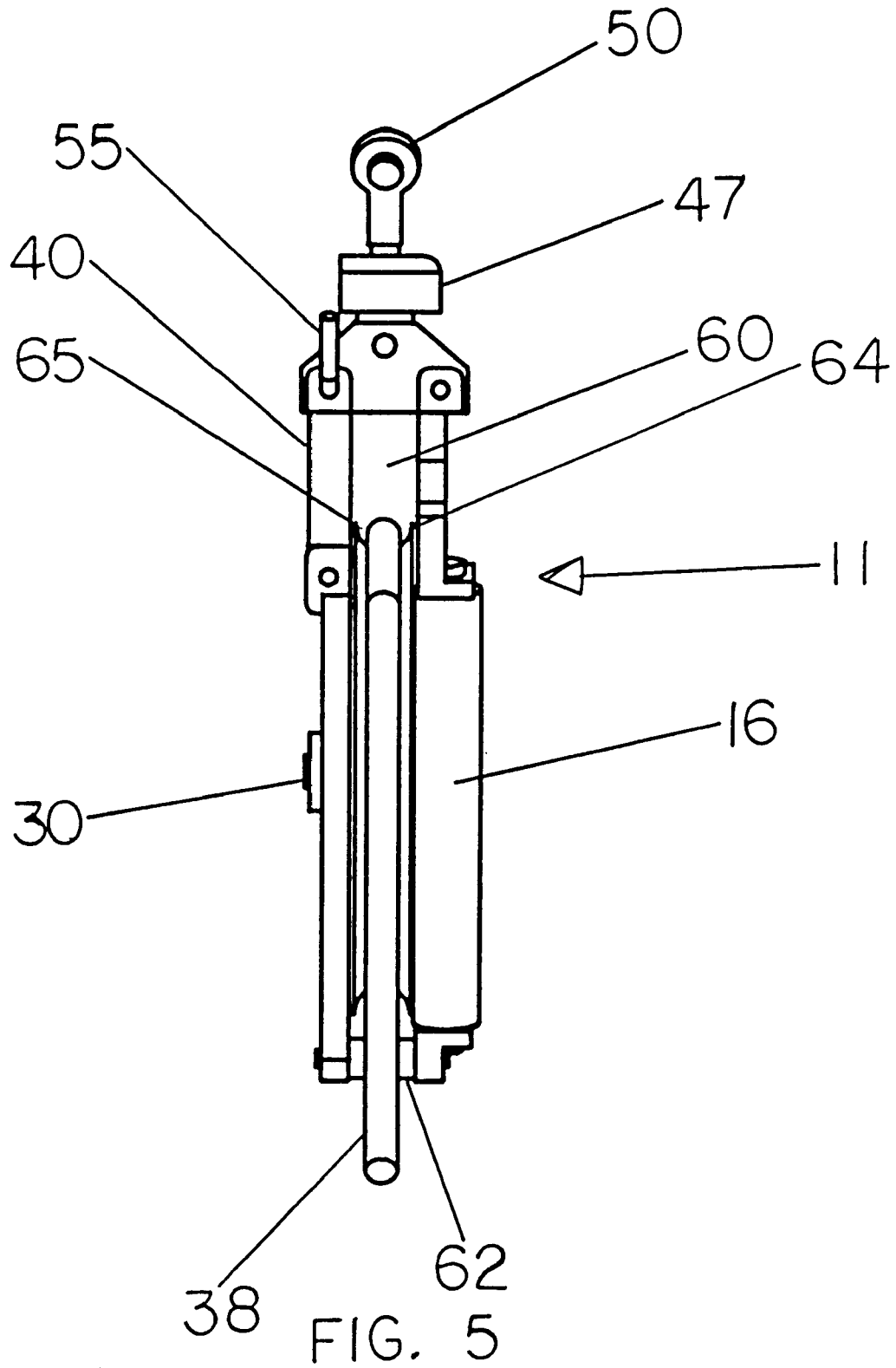
FIG. 5 is a side elevation of the embodiment shown in FIG. 3.

In operation, with the invention at ground level, a small-diameter leader rope is spliced or otherwise connected to a large-diameter hawser or bullrope which is in turn connected to cable 38 in a conventional manner, not shown. After the leader rope is laid into groove 36, gate 40 is rotated upward until teeth 41 mesh with brackets 44 and 45 after which a gate pin 55 is inserted through concentric holes 58 and 58' in assembly 39 effectively locking the leader rope and components connected thereto within the confines of space 60 as shown in FIGS. 2 and 5. The entire assembly may now be hoisted, while the leader rope is being paid out, to any desired position or attitude by a second cable, not shown, that is shackled or otherwise connected to arcuate bolt 53. Then, at a desired position of the device, the leader rope may be hauled in and thereafter the hawser until cable 38 is being drawn through space 60.

Although this invention has been disclosed and described with reference to a preferred embodiment, its principles are susceptible to other applications which will be apparent to persons skilled in the art. For example, other means may be used to form the space 60 in which the cable is confined and other means may be used to confine a cable in such a space. Thus, many modifications, additions, and deletions may be made to the invention without departure from the scope of the invention as set forth in the following claims.

What is claimed is:

1. A device for enabling the installation of conductive cables of various diameters to varying heights around deflections or angular structures, said device consisting of:
    a side guide with a first and second end, and mounting brackets formed on each of said ends,
    a mounting plate having a first and second end, said side guide and said mounting plate being bolted to each other in parallel relationship at said first ends,
    an axle and grooved pulley pivotally mounted between said side guide and said mounting plate,
    a holding and locking assembly pivotally mounted on said second end of said side guide,
    a gate having a first end and a second end, said first end of said gate pivotally mounted on said second end of said mounting plate, and said second end of said gate being mated and secured to said holding and locking assembly with a removable clevis, and
    a pair of rollers pivotally mounted between said side guide first and second end brackets thereby forming a rolling surface as the conductive cable is pulled through said grooved pulley.

* * * * *